United States Patent
Pfeifer

(10) Patent No.: US 7,287,550 B2
(45) Date of Patent: Oct. 30, 2007

(54) ASSEMBLY CONSISTING OF A VALVE MEMBER AND ADJUSTMENT DEVICE FOR A VEHICLE SERVO-STEERING ARRANGEMENT

(75) Inventor: Arnd Pfeifer, Willich (DE)

(73) Assignee: TRW Automotive GmbH (DE)

( * ) Notice: Subject to any disclaimer, the term of this patent is extended or adjusted under 35 U.S.C. 154(b) by 465 days.

(21) Appl. No.: 10/947,680

(22) Filed: Sep. 23, 2004

(65) Prior Publication Data
US 2005/0067594 A1 Mar. 31, 2005

(30) Foreign Application Priority Data
Sep. 23, 2003 (DE) .......................... 203 14 723 U

(51) Int. Cl.
*B62D 5/083* (2006.01)

(52) U.S. Cl. ................ 137/625.21; 251/304; 180/422; 180/441

(58) Field of Classification Search ........... 137/625.21, 137/625.22, 625.23; 251/208, 304; 180/422, 180/441
See application file for complete search history.

(56) References Cited

U.S. PATENT DOCUMENTS

| 1,191,700 | A | * | 7/1916 | Howes ........................ 251/208 |
| 3,934,564 | A | * | 1/1976 | Barnert ........................ 251/208 |
| 5,070,956 | A | | 12/1991 | Pawlak et al. |
| 5,242,150 | A | * | 9/1993 | Shiffler et al. .............. 251/208 |
| 6,305,490 | B1 | | 10/2001 | Loos et al. |

FOREIGN PATENT DOCUMENTS

| DE | 198 40 625 | 3/2000 |
| DE | 202 18 733 | 5/2003 |
| JP | 6 99826 | 4/1994 |

* cited by examiner

*Primary Examiner*—John Rivell
(74) *Attorney, Agent, or Firm*—MacMillan, Sobanski & Todd, LLC

(57) ABSTRACT

An assembly consists of a valve shaft, a valve member and an adjusting device which can alter the angle alignment of the valve member relative to the valve shaft.

19 Claims, 2 Drawing Sheets

ASSEMBLY CONSISTING OF A VALVE MEMBER AND ADJUSTMENT DEVICE FOR A VEHICLE SERVO-STEERING ARRANGEMENT

CROSS-REFERENCE TO RELATED APPLICATION

This application claims priority to German Application No. 203 14 723.5 filed Sep. 23, 2003, the disclosures of which are incorporated herein by reference.

The invention relates to an assembly consisting of a valve shaft and a valve member, as can be used in a hydraulic vehicle servo-steering arrangement.

BACKGROUND OF THE INVENTION

Hydraulic vehicle servo-steering arrangements are generally known. In principle, they are based on the fact that the rotation between an input shaft, which is coupled with the steering wheel, and an output shaft, which is part of a servo-steering valve, is converted into a hydraulic current, which in turn is converted into a steering support force. In a generally usual construction, two valve sleeves are used, one of which is securely connected with the input shaft and the other with the output shaft. When the input shaft is rotated relative to the output shaft, the two valve sleeves are also rotated relative to each other. Through this rotation, the hydraulic current is generated, which is then converted into the steering support force, for example in a hydraulic cylinder.

In modern motor vehicles, electronic stability programs are being increasingly used, by means of which the vehicle stability it to be actively improved. A possibility for the action of such an electronic stability program consists in actively engaging in the steering of the vehicle. For example, a correction angle can be superimposed on the steering angle which is given by the driver via the steering wheel. For this purpose, a gearing can be used, which is interposed into the path of the flux of force between the steering wheel and the steerable vehicle wheels. The problem with such a construction consists in ensuring that the vehicle also remains steerable in the case of a possible defect of the gearing.

SUMMARY OF THE INVENTION

The object of the invention consists in providing an assembly by means of which, with little expenditure, a correction angle can be generated in a steering system, whilst at the same time a maximum security against failure is provided.

For this purpose, according to the invention an assembly is provided consisting of a valve shaft, a valve member and an adjustment device, by means of which the angle alignment of the valve member can be altered relative to the valve shaft. This assembly is based on the fundamental concept of not using a separate gearing to produce the steering correction, but rather to act directly on the relative position between the two valve sleeves. In this way, the correction angle can be produced directly in the steering gear.

According to a preferred embodiment of the invention, provision is made that the valve shaft is the output shaft of a servo-steering valve and that the valve member is the valve sleeve of a servo-steering valve. As adjustment device, an eccentric can be used which is driven by a motor via a gear.

The motor here can be arranged inside the output shaft, so that a particularly compact construction is produced.

Other advantages of this invention will become apparent to those skilled in the art from the following detailed description of the preferred embodiment, when read in light of the accompanying drawings.

BRIEF DESCRIPTION OF THE DRAWINGS

The invention is described below with the aid of a preferred embodiment, which is illustrated in the enclosed drawings. In these.

DETAILED DESCRIPTION OF THE INVENTION

Figure 1:
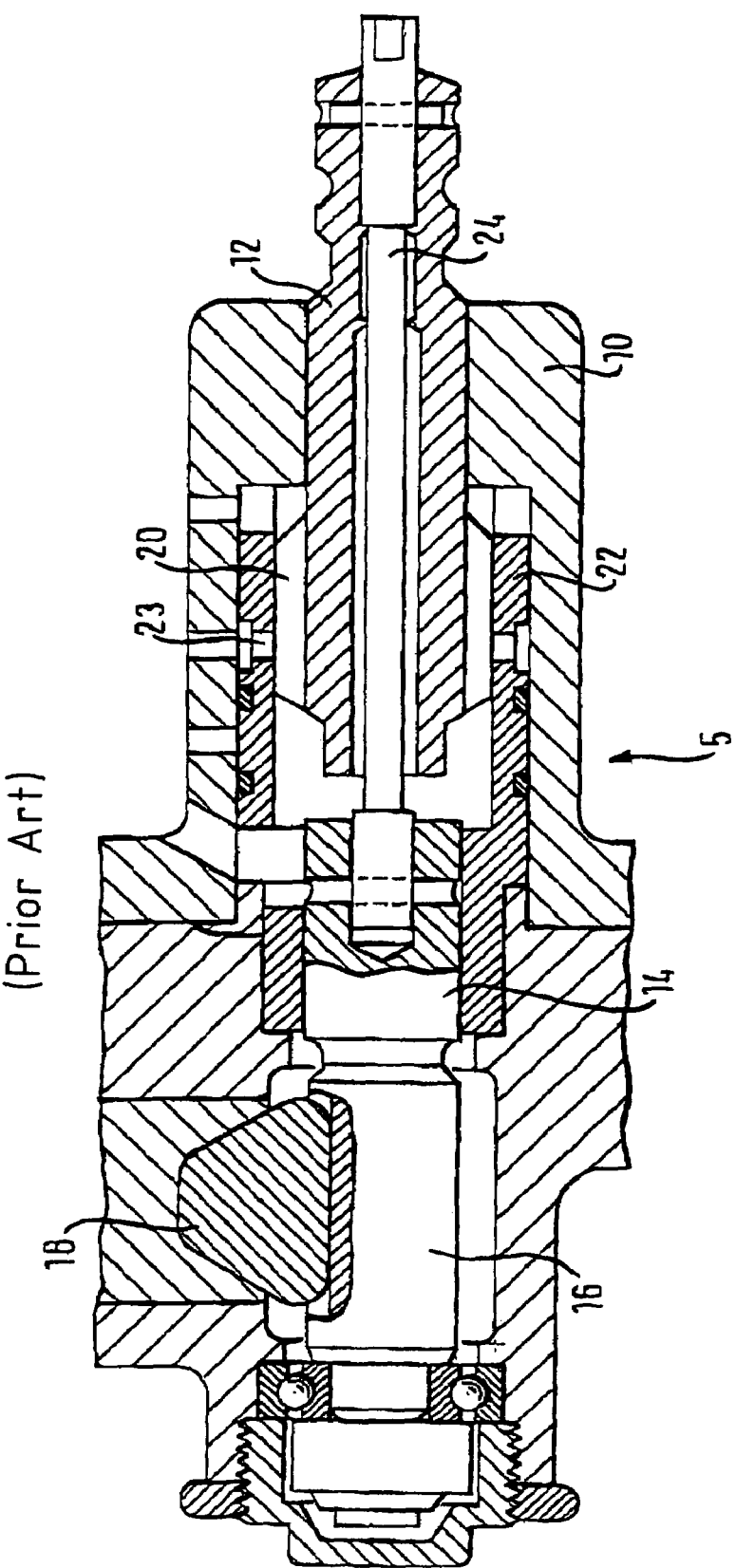
FIG. 1 shows in a diagrammatic sectional view a servo-steering gear according to the prior art.

In FIG. 1 a servo-steering gear 5 is shown, by means of which the rotation of an input shaft 12, arranged in a housing 10, by means of an output shaft 14 and a pinion 16 connected therewith, is able to be converted into a displacement of a rack 18. A steering wheel (not illustrated) can be connected with the input shaft 12, and steerable vehicle wheels (not illustrated) can be connected with the rack 18, so that a vehicle provided with the servo-steering gear 5 can be steered.

The input shaft is provided on its outer side with control grooves 20, so that a first valve member is formed. A second valve member 22, which is constructed as a valve sleeve, is connected with the output shaft 14. The valve sleeve has several control openings 23, which cooperate with the control grooves 20. Between the input shaft 12 and the output shaft 14, a torsion rod 24 is arranged, which acts upon the two shafts into a neutral position.

The two valve members form a servo-valve (only illustrated diagrammatically here), with which a hydraulic current, provided by a servo-pump (not illustrated), can be directed for example into one or other chamber of a hydraulic cylinder, whereby a steering support is provided. This is generally known, so it does not have to be entered into in further detail here.

Figure 2:
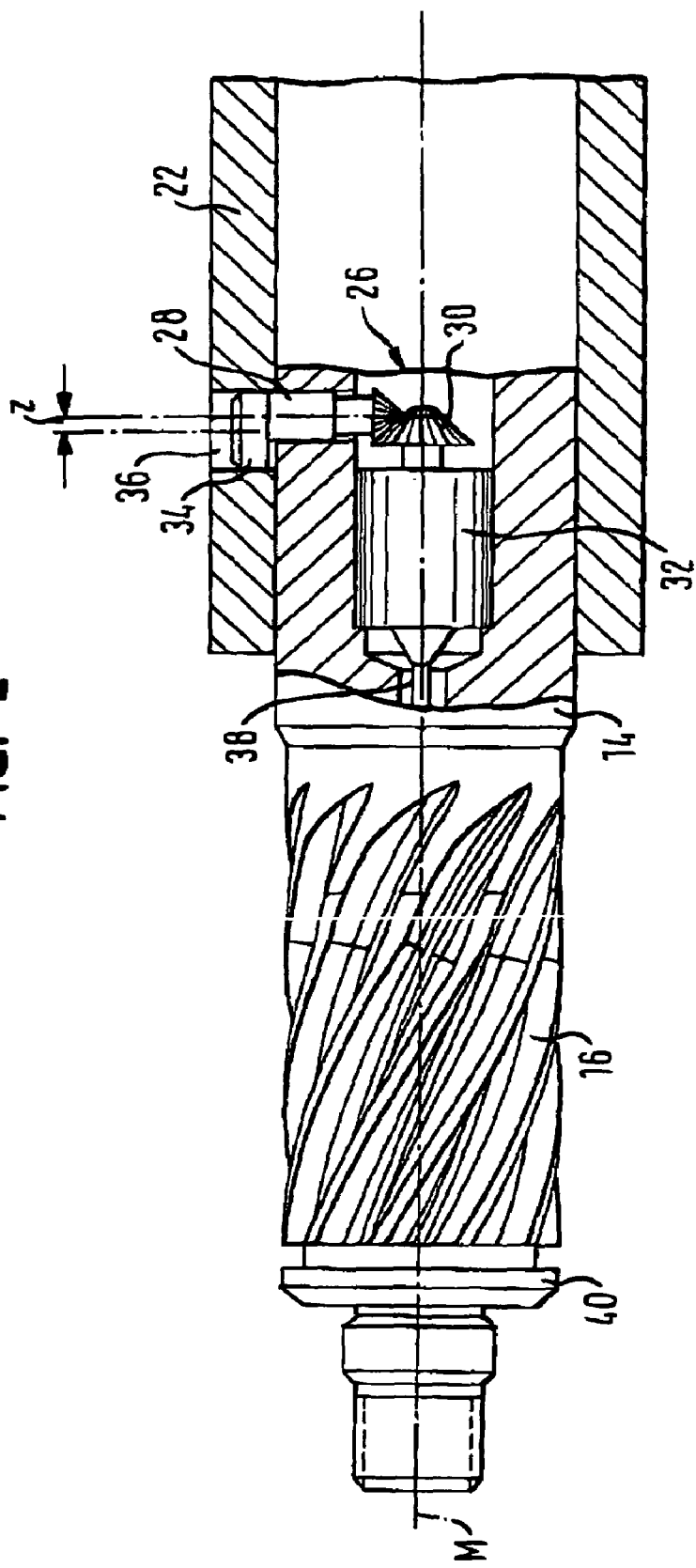
FIG. 2 shows in a diagrammatic sectional view an assembly according to the invention.

In FIG. 2, an assembly according to the invention is illustrated, which consists of the valve sleeve 22 and the output shaft 14. In contrast to the prior art, in which the valve sleeve is connected with the output shaft 14 so as to be secure with regard to rotation, provision is made according to the invention that the valve sleeve is rotatable to a limited extent relative to the output shaft. To set a particular angle alignment, an adjusting device 26 is used, which consists of an eccentric pin 28, a gear 30 and a motor 32. The eccentric pin 28 is mounted radially on the output shaft 14 and engages with an eccentric 34 into a bore 36 of the valve sleeve 22. The gear 30 here is a miter gear with which the eccentric pin 28 is coupled with the motor 32 so that the alignment of the eccentric 34 can be adjusted. The motor is connected by cable 38 and a slip ring 40 with a control unit (not illustrated).

In FIG. 2 the valve sleeve is in its neutral position. This is distinguished in that the distance z between the central axis of the eccentric and the rotation axis of the eccentric pin 28 is maximum in axial direction in relation to the central axis M of the assembly. When the eccentric pin 28 is rotated from this position in one or other direction, the valve sleeve 22 also rotates in one or other direction relative to the output shaft 14. The maximum rotation of the valve sleeve 22 is reached after a rotation of the eccentric pin through 90 degrees; with continued rotation, the valve sleeve 22 is rotated in peripheral direction to the neutral position again (of course staggered in axial direction).

Through the rotation of the valve sleeve, an active steering impulse can be introduced into the steering system, which is superimposed on the steering signal provided by the steering wheel. In this way, for example, a side wind rectification can take place.

A particular advantage of the system which is shown consists in that also in the case of a failure of the control of the electromotor 32 or even of the electromotor itself or also of the gear, a fixed drive from the valve sleeve 22 to the output shaft is always guaranteed.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An assembly comprising a valve shaft, the valve shaft including an at least one contact ring, a valve member and an adjusting device, by means of which the angle alignment of the valve member can be altered relative to the valve shaft.

2. The assembly according to claim 1, wherein the valve shaft is the output shaft of a servo-steering valve.

3. The assembly according to claim 1, wherein the valve shaft is provided with a pinion.

4. The assembly according to claim 1, wherein the valve member is the valve sleeve of a servo-steering valve.

5. The assembly according to claim 1, wherein the adjusting device contains an eccentric.

6. The assembly according to claim 1, wherein the adjusting device contains a motor.

7. The assembly according to claim 1, wherein the adjusting device contains a gear.

8. The assembly of claim 1 wherein the assembly is a servo-steering valve for a hydraulic vehicle servo-steering arrangement.

9. An assembly comprising a valve shaft, a valve member and an adjusting device, the adjusting device including an eccentric, by means of which angular alignment of the valve member can be altered relative to the valve shaft.

10. The assembly according to claim 9, wherein the valve shaft is the output shaft of a servo-steering valve.

11. The assembly according to claim 9, wherein the valve shaft is provided with a pinion.

12. The assembly according to claim 9, wherein the valve shaft is provided with at least one contact ring.

13. The assembly according to claim 9, wherein the valve member is the valve sleeve of a servo-steering valve.

14. The assembly according to claim 9, wherein the adjusting device contains a motor.

15. The assembly according to claim 9, wherein the adjusting device contains a gear.

16. An assembly comprising a valve shaft, a valve member, and an adjustment device by means of which angular alignment of the valve member can be altered relative to the valve shaft, wherein the valve shaft is an output shaft of a servo steering valve, and wherein the adjusting device contains a motor which is arranged within the output shaft of the servo steering valve.

17. The assembly according to claim 16, wherein the adjusting device includes a gear and an eccentric.

18. An assembly comprising a valve shaft, a valve member, and an adjusting device by means of which angular alignment of the valve member can be altered relative to the valve shaft, wherein the valve member is a valve sleeve of a servo steering valve, and wherein the adjusting device contains a motor, the motor being arranged within the valve sleeve.

19. The assembly of claim 18 wherein the valve shaft includes a pinion and an at least one contact ring.

* * * * *